United States Patent [19]

Higashiguchi

[11] Patent Number: 5,350,898
[45] Date of Patent: * Sep. 27, 1994

[54] CUTTING APPARATUS FOR FABRICS AND THE LIKE UTILIZING A HEATED CUTTER WITH CLEANING MEANS

[75] Inventor: Shigeji Higashiguchi, Tokyo, Japan

[73] Assignee: Kabushiki Kaisha Tokyo Horaisha, Tokyo, Japan

[*] Notice: The portion of the term of this patent subsequent to Nov. 16, 2010 has been disclaimed.

[21] Appl. No.: 91,129

[22] Filed: Jul. 14, 1993

Related U.S. Application Data

[63] Continuation of Ser. No. 568,730, Aug. 17, 1990, Pat. No. 5,262,617.

[51] Int. Cl.$^5$ ............ D05B 1/00; D05B 3/00; D06H 7/00
[52] U.S. Cl. .................... 219/221; 83/171; 83/76.1; 83/575; 83/168
[58] Field of Search .......... 219/221, 227, 229; 83/168, 170, 171, 15, 16, 76.1, 76.7, 575, 577, 589; 346/29, 139 R

[56] References Cited

U.S. PATENT DOCUMENTS

| | | | |
|---|---|---|---|
| 2,806,758 | 9/1957 | Butler et al. | 346/139 R |
| 3,023,656 | 3/1962 | Glastra | 83/577 |
| 3,127,678 | 4/1964 | Muldoon | 346/29 |
| 3,245,294 | 4/1966 | Butler et al. | 83/168 |
| 3,264,924 | 8/1966 | Yaron | 83/589 |
| 3,333,273 | 7/1967 | Kallen et al. | 346/29 |
| 3,360,799 | 12/1967 | Polster | 346/29 |
| 3,477,322 | 11/1969 | Gerber et al. | 83/76.5 |
| 3,518,907 | 7/1970 | Pinel | 83/575 |
| 3,900,853 | 8/1975 | White | 346/29 |
| 4,112,797 | 9/1978 | Pearl | 83/177 |
| 4,122,736 | 10/1978 | Price et al. | 83/168 |
| 4,133,233 | 1/1979 | Pearl | 83/71 |
| 4,171,657 | 10/1979 | Halberschmidt et al. | 83/76.7 |
| 4,373,412 | 2/1983 | Gerber et al. | 83/71 |
| 4,430,718 | 2/1984 | Hendren | 83/171 |
| 4,577,539 | 3/1986 | Bonacci | 83/76.6 |
| 4,621,428 | 11/1986 | Fukumura et al. | 346/140 R |
| 4,624,169 | 11/1986 | Nelson | 83/76.7 |
| 4,653,362 | 3/1987 | Gerber | 83/171 |
| 4,702,195 | 10/1987 | Thielmann | 239/107 |
| 4,754,404 | 6/1988 | Inoue | 83/16 |
| 4,805,830 | 2/1989 | Kawaguchi | 219/85.1 |
| 5,091,625 | 2/1992 | Kohda et al. | 219/121.54 |
| 5,262,617 | 11/1993 | Higashiguchi | 219/221 |

FOREIGN PATENT DOCUMENTS

| | | | |
|---|---|---|---|
| 502244 | 9/1992 | European Pat. Off. | |
| 528097 | 2/1993 | European Pat. Off. | 83/168 |
| 3-86500 | 4/1991 | Japan | 83/168 |

*Primary Examiner*—Bruce A. Reynolds
*Assistant Examiner*—John A. Jeffery
*Attorney, Agent, or Firm*—Paul A. Guss

[57] ABSTRACT

An apparatus for cutting fabrics and the like includes a workbench on which the fabric is placed, a first movable carriage freely movable in one direction along one side of the work bench, and a second movable carriage mounted on the first carriage which is freely movable in a direction perpendicular to the direction of movement of the first carriage. A cutter including a heated tip, is mounted on the second carriage, and the heated tip is displaceable into contact with a fabric for cutting a desired mark or pattern out of the fabric. The apparatus additionally includes an absorbent member for cleaning the heated tip after a cutting operation. The apparatus permits an automatic and efficient cutting operation for marks and can be manufactured economically.

11 Claims, 9 Drawing Sheets

CUTTING APPARATUS FOR FABRICS AND THE LIKE UTILIZING A HEATED CUTTER WITH CLEANING MEANS

This application is a continuation of application Ser. No. 07/568,730, filed Aug. 17, 1990, now U.S. Pat. No. 5,262,617.

BACKGROUND OF THE INVENTION

1) Field of the Invention

The present invention relates to a cutting apparatus of fabric and the like (hereinafter simply called "fabric") for marks, and more specifically to a cutting apparatus of fabric for marks, wherein a cutting means such as a heat cutter is provided so as to be freely movable in two axial directions on the orthogonal coordinate system to a work bench, so that after placing the fabric on the work bench, any desired marks can be automatically and efficiently cut out of the fabric through the cutting means.

2) Description of the Related Art

In order to make one's own place of work and/or one's team clear, or to identify an individual, it has heretofore been conducted in general to apply a mark, number and/or the like to a uniform. In general, pressure sensitive marks are widely used as such marks. Namely, an adhesive is applied on the back side of a fabric for mark by lamination treatment in advance. After cutting a desired mark out of the fabric in accordance with a pattern, the thus-cut mark is positioned on an object to be applied under pressure such as a uniform and then fixed thereto by melting the adhesive on a hot press or the like. In the cutting of the desired mark out of the fabric, the following method has been used heretofore.

Figure 1A:
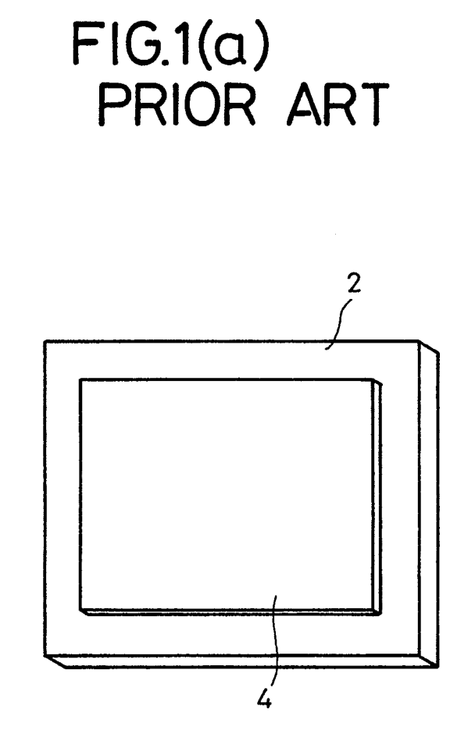
FIG. 1 is an explanatory illustration showing the procedure of a cutting operation for a mark according to the prior art.
Figure 1B:
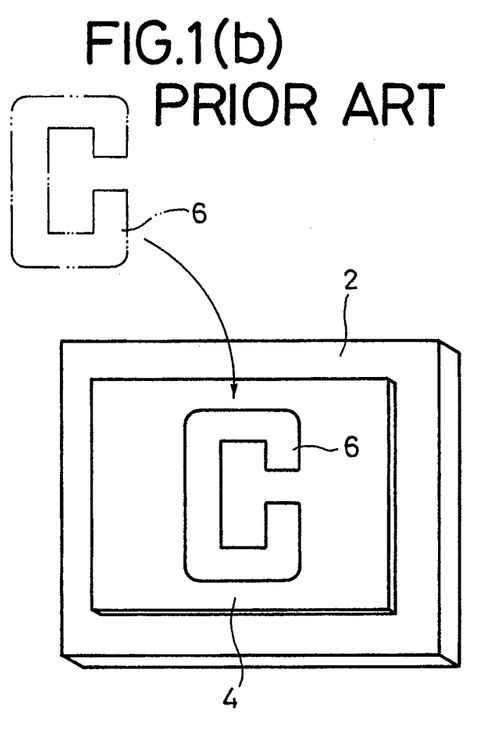
Figure 1C:
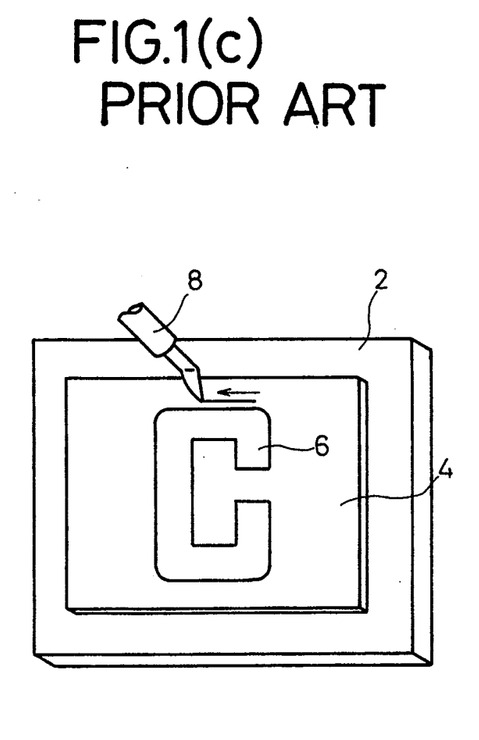

As illustrated in FIG. 1(a), a fabric 4 is first of all placed on a mount 2. A paper pattern 6, which has been formed into a desired mark configuration in advance, is then positioned on the fabric 4 [see in FIG. 1(b)]. As depicted in FIG. 1(C), for example, a heat cutter 8 as a cutting means is then moved along the contour of the paper patter 6, thereby melt-cutting a desired mark out of the fabric 4. The thus-cut mark is then taken out of the mount 2.

However, a paper pattern 6 corresponding to a mark configuration must be prepared in advance in the conventional method. Therefore, when marks of various patterns must be cut out, the production work itself of their corresponding paper patterns 6 becomes considerably troublesome. In addition, upon the cutting operation for marks, an operator must substantially move the heat cutter 8 along the contour of the paper pattern 6. There are hence pointed out disadvantages that marks to be cut out hence vary widely in configuration and moreover the cutting operation for marks cannot be efficiently achieved.

Accordingly, a laser cutting apparatus by way of example has been used with a view toward automatically conducting the cutting operation for marks. It is however indicated for such a laser cutting apparatus to involve demerits that its size is considerably large and it is expensive.

Furthermore, since in the conventional method, the mount 2 is generally formed of a metallic material such as a stainless steel, the mount 2 tends to be damaged when the fabric 4 is melt-cut by the heat cutter 8, so that the damaged mount 2 must be relatively often exchanged for a new mount 2. Therefore, there are pointed out disadvantages that the exchange work of the mount 2 is troublesome and the frequent exchange of mounts is uneconomical. When the melt-cutting of fabrics is continued by the heat cutter 8 heated to a considerably high temperature, the mount 2 itself is also heated, so that there are often a potential problem that the adhesive 4 applied to the back side of the fabric 4 is melted and hence the fabric 4 is fixed to the mount 2.

Moreover, upon effecting the cutting operation for marks automatically, in particular, the cleaning operation of the cutting means has become a problem. Namely, when the melt-cutting of the fabric 4 are carried out by the heat cutter 8 as described above, molten matter composed of the fabric 4 itself and adhesive tends to be formed at the tip of the heat cutter 8. Therefore, an operation to remove the molten matter from the heat cutter 8 must be performed at relatively frequent intervals. Indeed, it is necessary to stop the operation of the cutting apparatus so that an operator himself may clean the heat cutter 8. Accordingly, the cutting operation for marks is often discontinued, so that there are revealed disadvantages that the cutting operation for marks cannot be effected efficiently and it is difficult to automatize the cutting operation for the marks.

SUMMARY OF THE INVENTION

It is a principal object of this invention to provide a cutting apparatus of fabric for marks, which is capable of automatically and efficiently cutting a desired mark out of the fabric placed on a work bench, and the apparatus is allowed to be manufacture economically to a small size as a whole.

Another object of this invention is to provide a cutting apparatus of fabric for marks, in which a cutting means such as a heat cutter is attached to a moving mechanism to be two-dimensional freely movable on a work bench, and a glass plate as a mount on which the fabric is directly placed is provided on the work bench, whereby a desired mark can be surely and automatically cut out of the fabric through the cutting means without damaging the mount itself and with the mount prevented from being affected by heat.

A further object of this invention is to provide a cutting apparatus of fabric for marks, in which a cutting means such as a heat cutter is attached to a moving mechanism which is two-dimensionally freely movable on a work bench for the fabric, and a cleaning means made of a sponge or the like is disposed on the work bench in the vicinity of the original position of the cutting means so that the cutting means may be moved after completion of the cutting operation for a desired mark or after a predetermined lapse of time so as to automatically clean the cutting means by the cleaning means, whereby the cleaning operation of the cutting means can be effected without stopping the cutting operation and the desired mark can hence be automatically and efficiently cut out of the fabric.

A still further object of this invention is to provide a cutting apparatus of fabric for marks, which comprises:

a work bench on which the fabric is placed;

a first moving means freely movable in one direction along the side of the work bench;

a second moving means disposed on the first moving means and freely movable in a direction perpendicular to said one direction; and a cutting means attached to the second moving means for cutting a desired mark out of the fabric.

A yet still further object of this invention is to provide a cutting apparatus of fabric for marks, which is provided with a displacement means serving to displace the cutting means attached to the second moving means between a position for cutting the fabric and a position spaced from the fabric.

A yet still further object of this invention is to provide a cutting apparatus of fabric for marks, wherein the first moving means comprises:

a first moving member freely movable under action of an actuator along one side of the work bench; and a moving aid connected to the first moving member through guide bars extending in the direction perpendicular to the moving direction of the first moving member and movable in conjunction with the first moving member along the other side of the work bench, wherein the second moving means comprises:

a second moving member freely movable along guide bars under action of an actuator; and an arm member equipped with a cutting means, swingably supported on the second moving member and engaged with the displacement means.

A yet still further object of this invention is to provide a cutting apparatus of fabric for marks, wherein the displacement means comprises:

a supporting bar extending in parallel with the guide bars, which connected between the first moving member and a moving aid, and having a length corresponding to the moving range of the second moving member;

an actuator serving to displace the supporting bar so that the arm member may be kept at a predetermined position by the supporting bar.

A yet still further object of this invention is to provide a cutting apparatus of fabric for marks, wherein the actuator substantially comprises a linear solenoid, and is constituted so as to engage one end of a swinging member, which holds the supporting bar, with a moving element extending from the linear solenoid and fixedly attached to a spring at the other end of the swinging member.

A yet still further object of this invention is to provide a cutting apparatus of fabric for marks, wherein the arm member supported by the second moving member is constituted so as to be swingable to a cutting position of the fabric, a position held by the supporting bar and a position spaced from the supporting bar.

A yet still further object of this invention is to provide a cutting apparatus of fabric for marks, wherein a cord connected to the cutting means is held by a flexible supporting member.

A yet still further object of this invention is to provide a cutting apparatus of fabric for marks, wherein the cutting means substantially comprises a heat cutter.

A yet still further object of this invention is to provide a cutting apparatus of fabric for marks, wherein the cutting means substantially a gas torch.

A yet still further object of this invention is to provide a cutting apparatus of fabric for marks, which comprises:

a work bench;

a moving mechanism movable in two axial directions on an orthogonal coordinate system along the work bench; and a cutting means attached to the second moving means for cutting a desired mark out of the fabric, the work bench being provided with a glass-made mount on which the fabric is directly placed.

A yet still further object of this invention is to provide a cutting apparatus of fabric for marks, wherein the mount is detachably provided on the work bench.

A yet still further object of this invention is to provide a cutting apparatus of fabric for marks, wherein a recess for receiving the mount is defined in the work bench, and an opening is defined in communication with the recess so as to be capable of inserting fingers therein to remove the mount from the work bench.

A yet still further object of this invention is to provide a cutting apparatus of fabric for marks, wherein the moving mechanism comprises:

a first moving means freely movable in one direction along the side of the work bench; and a second moving means disposed on the first moving means, freely movable in a direction perpendicular to the one direction, and equipped with the cutting means.

A yet still further object of this invention is to provide a cutting apparatus of fabric for marks, which comprises:

a work bench on which the fabric is placed;

a moving mechanism movable in two axial directions on the orthogonal coordinate system along the work bench;

a cutting means attached to the second moving means and cutting a desired mark out of the fabric; and a cleaning means for automatically cleaning the cutting means by moving the cutting means under operation of the moving mechanism.

A yet still further object of this invention is to provide a cutting apparatus of fabric for marks, wherein the cleaning means substantially comprises a sponge containing cleaning water, and containing a slit cut in the sponge so that the cutting means can be inserted in the slit by moving the cutting means under operation of the moving mechanism to clean the cutting means.

A yet still further object of this invention is to provide a cutting apparatus of fabric for marks, wherein the cleaning means is disposed on the work bench and in the vicinity of the original position of the cutting means and the cutting means is cleaned after every cutting operation.

Other objects and advantages of the present invention will be readily appreciated from the preferred embodiments of this invention, which will be described subsequently in detail by reference to the accompanying drawings.

DETAILED DESCRIPTION OF THE PREFERRED EMBODIMENTS

Figure 2:
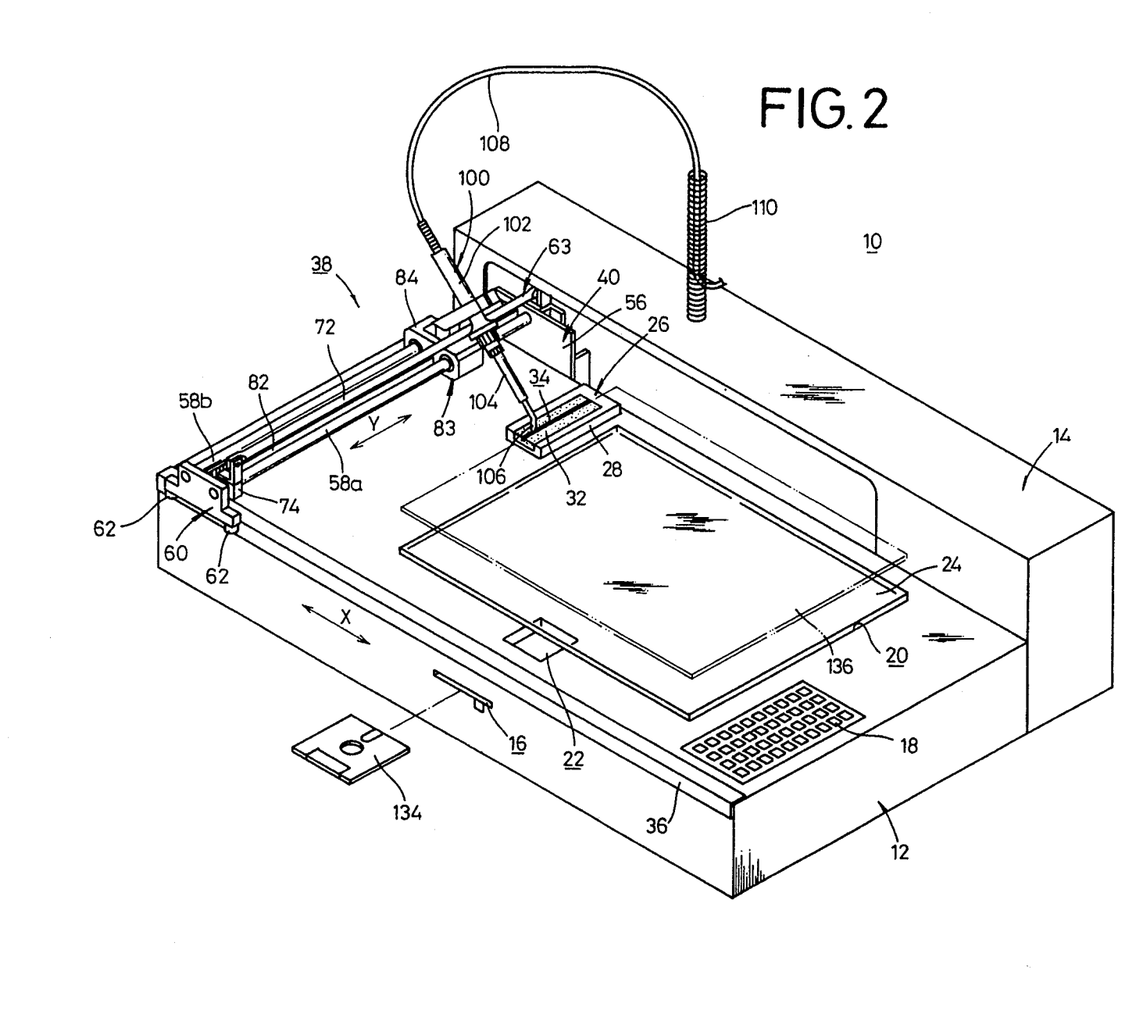
FIG. 2 is a schematic perspective view of a cutting apparatus of fabric for marks according to this invention.

In FIG. 2, numeral 10 indicates a cutting apparatus of fabric for marks according to an embodiment of this invention. The cutting apparatus 10 comprises a work bench 12 and a rectangular box 14 attached on one side in the crosswise direction of the work bench 12. A control section, which will be described subsequently, is housed in the work bench 12, and a floppy disk inserting port 16 is defined on the other side of the work bench 12 opposite to the rectangular box 14. A sheet key 18 is provided on the upper surface on one side in the longitudinal direction of the work bench 12 and a relatively shallow recess 20 corresponding to the shape of a mount, which will be described subsequently, is defined in the upper surface substantially in the center of the work bench 12. An opening 22 is defined in the work bench 12 at the position close to the inserting port 16 in such a manner that its depth is far deeper than that of the recess 20. A portion of the opening 22 communicates with the recess 20. A mount 24 having a rectangular form and made of a glass plate is received in the recess 20.

Figure 5:
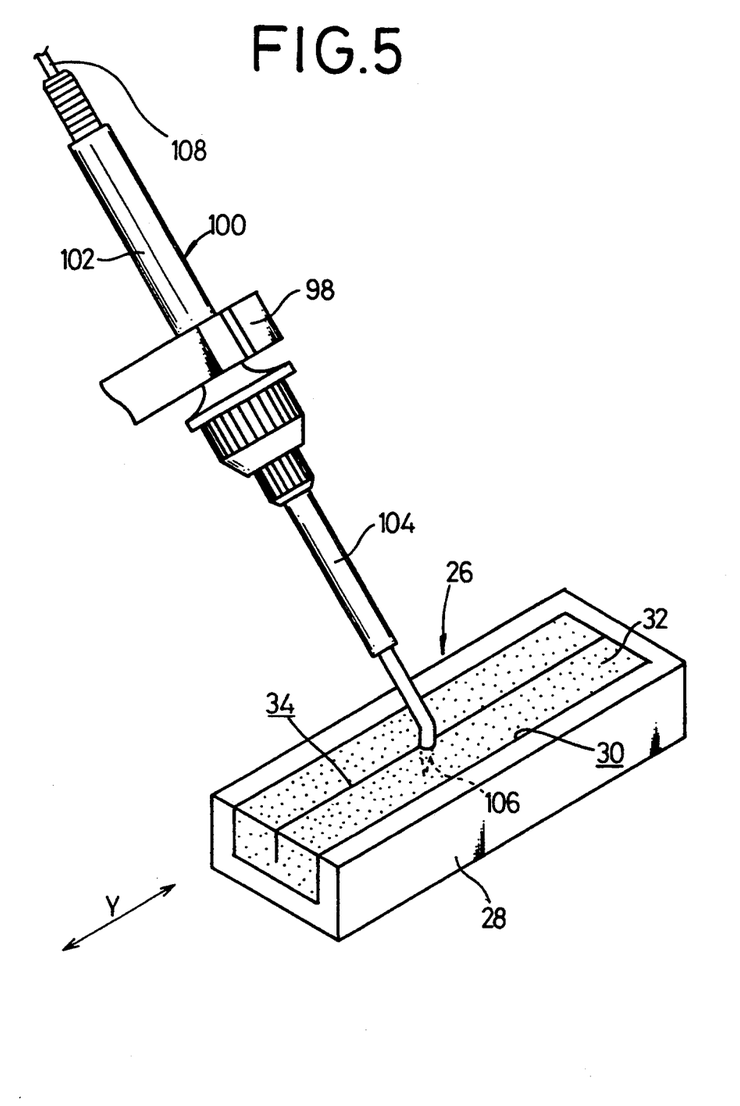
FIG. 5 is a perspective view of a cleaning means as a constituent of the cutting apparatus.

A cleaning means 26 for a cutting means is attached in the vicinity of the rectangular box 14 on the work bench 12. As illustrated in FIG. 5, the cleaning means 26 has a casing 28 in which an open space 30 is defined by cutting the upper part and one end of the casing 28 off. A sponge 32 is charged in the open space 30. A slit 34 having a predetermined depth from the upper surface is cut in the sponge 32. The slit 34 substantially extends in a direction of an arrow Y. To the sponge 32, cleaning water is supplied in advance.

Figure 3:
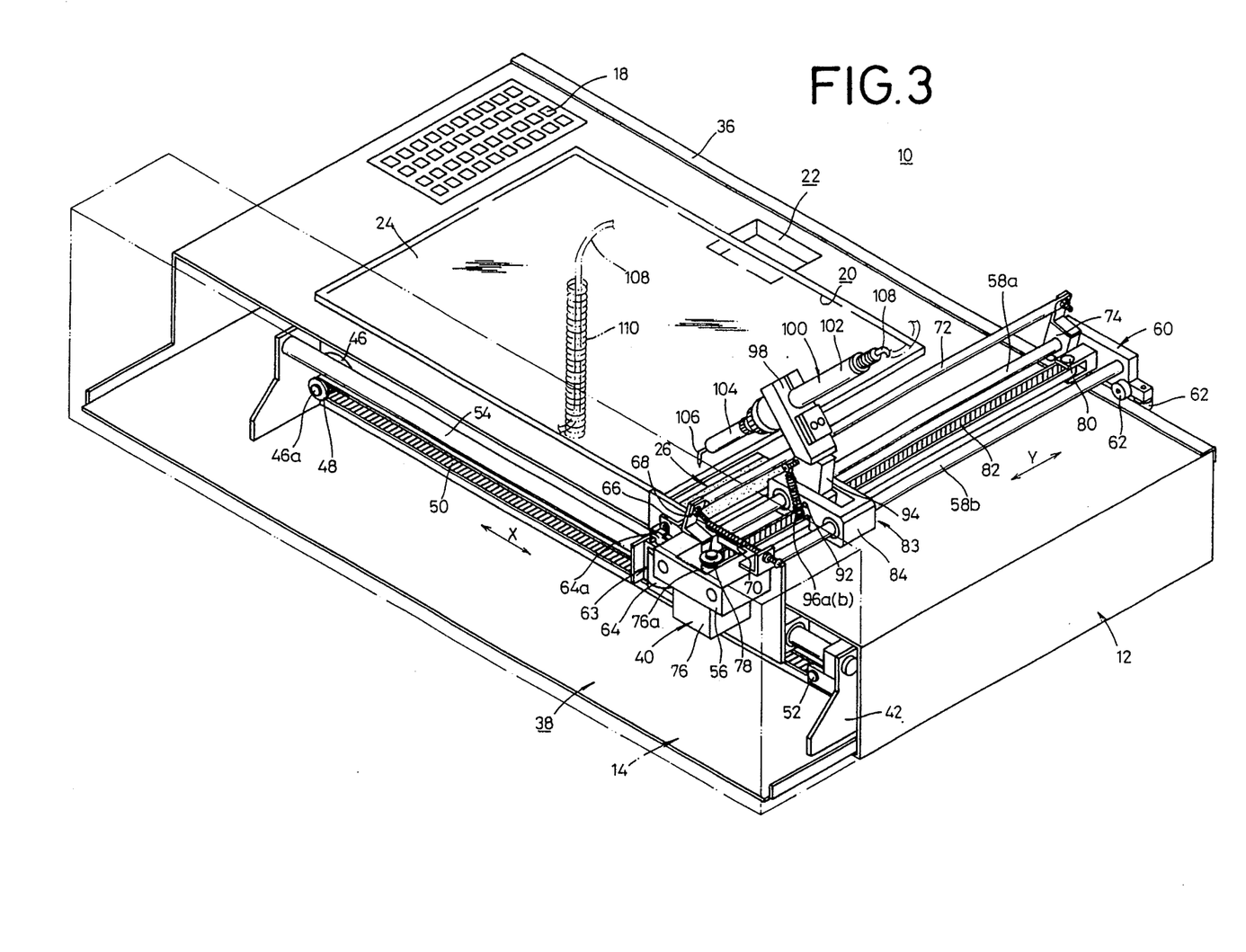
FIG. 3 is an explanatory view in perspective, partially omitted, of the cutting apparatus.

A guide rail 36, which extends to both ends of the work bench 12 and has been bent by about 90° from the center, is fixedly attached to one edge situated at a position higher than the inserting port 16 (see FIGS. 2 and 3).

A moving mechanism 38 is provided, said mechanism serving to move a cutting means, which will be described subsequently, in two axial directions (directions of arrows X and Y) on the orthogonal coordinate system to the work bench 12. The moving mechanism 38 has a first moving means 40 which is disposed on the side of the rectangular box 14 and is freely movable in the longitudinal direction of the work bench 12 (a direction of an arrow X). Namely, as illustrated in FIG. 3, a holding member 42, which extends to a predetermined length in the direction of the arrow X, is fixed in the rectangular box 14. A rotational driving source 46 is fixedly attached to one end of the holding member 42. A pulley 48 is rotatably attached to a rotating driving shaft 46a extending from the rotational driving source 46. On the pulley 48, one end of a grooved belt 50 is extended, while the other end of the grooved belt 50 is extended on a roller 52 detachably borne on the other end of the holding member 42. A guide rail 54 bridges the holding member 42 over the grooved belt 50 and supports a first moving member 56, with which one end of the grooved belt 50 is engaged.

At one end of a pair of guide bars 58a, 58b, which extend in a crosswise direction of the work bench 12, i.e., in the direction of the arrow Y perpendicular to the direction of the arrow X, the guide bars are coupled with the first moving member 56. On the other hand, a moving aid 60 is fixedly attached to the other ends of the guide bars 58a, 58b, and bears a plurality of guide rollers 62 which separately roll on the upper and side surfaces of the guide rail 36.

Figure 4:
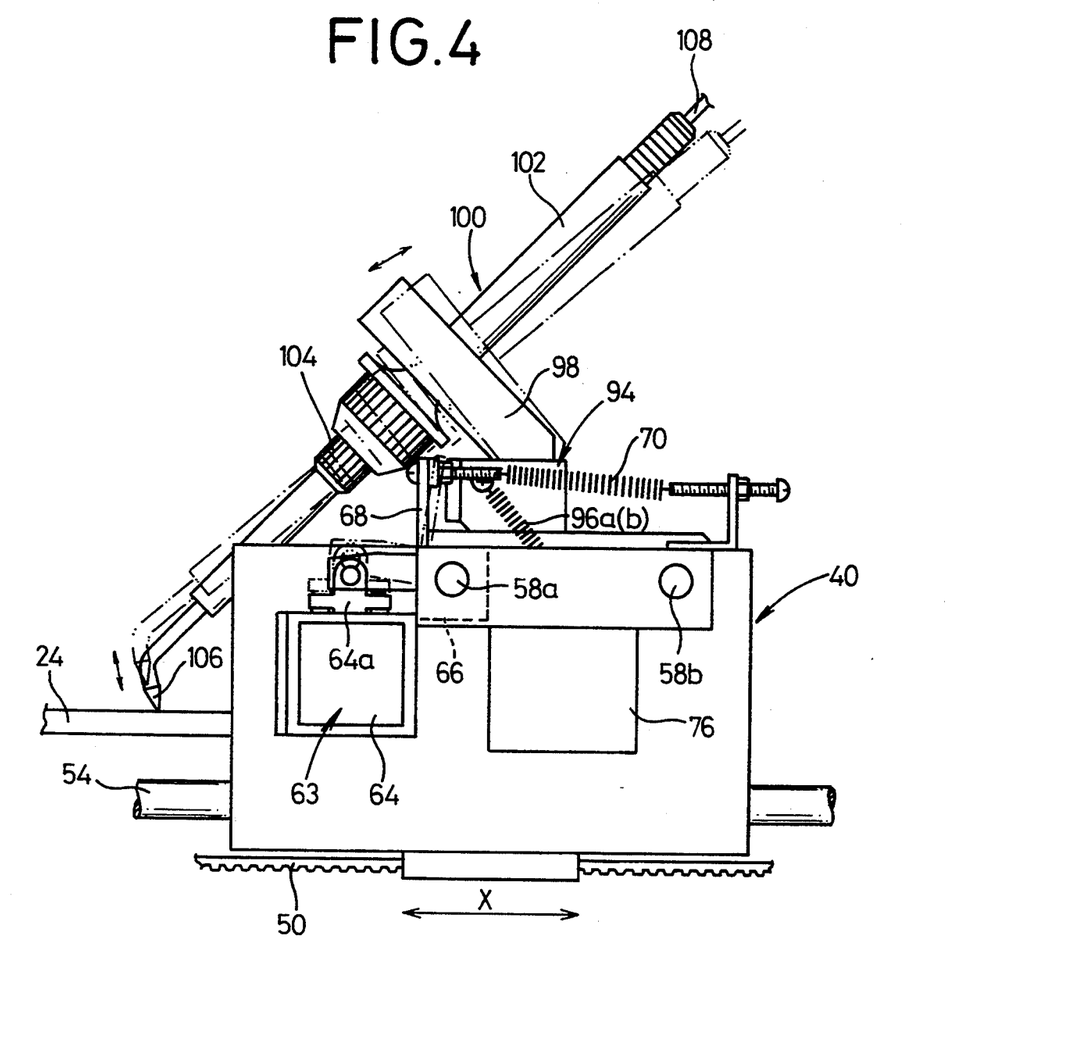
FIG. 4 is a side elevation view, partially omitted, to illustrate a displacement means as a constituent of the cutting apparatus.

A linear solenoid 64 constituting a displacement means 63 is attached to the first moving member 56, and one end of a swinging member 66 is joined to a rod 64a, i.e., a moving element, which extends vertically and upwardly from the solenoid 64 (see FIG. 4). The other end of the swinging member 66 slidably fits in the guide bar 58a. To the swinging member 66, a mounting plate 68 is attached to stretch a spring 70 between the mounting plate 68 and the first moving member 56. One end of a supporting bar 72 is fixedly attached to the mounting plate 68. The supporting bar 72 has a length corresponding to the moving range to the direction of the arrow Y of a second moving means, which will be described subsequently, and extends in parallel with the guide bar 58a, and moreover the other end of the supporting bar 72 is joined to a mounting member 74 swingably engaged with the end of the guide bar 58a.

To the first moving member 56, a rotational driving source 76 is fixedly attached in parallel with the solenoid 64, and a pulley 78 is rotatably fitted to a rotating driving shaft 76a extending vertically and upwardly from the rotational driving source 76. A auxiliary roller 80 is borne on the moving aid 60, and a grooved belt 82 is extended between the auxiliary roller 80 and the pulley 78.

A second moving means 83 is movably fitted in the direction of the arrow Y through the guide bars 58a, 58b and the grooved belt 82. The second moving means 83 has a second moving member 84, which substantially slidably fits in the individual guide bars 58a and 58b and is engaged with one end of the grooved belt 82, and an arm member 94 supported swingably on the second moving member 84 through a support shaft 92. The arm member 94 actually swings from the vertical upper direction to the side of the guide bar 58b by a predetermined angle [see FIG. 7(a)] and both ends of springs 96a, 96b are respectively attached under tension to the arm member 94 and the second moving member 84. The arm member 94 is biased vertically downwardly through these springs 96a, 96b. A holding part 98 made of a resinous material is attached to the arm member 94, and a cutting means, for example, a heat cutter 100 is fitted to the holding part 98.

The heat cutter 100 substantially comprises a main body 102 held by the holding part 98, a holder part 104 attached to the main body 102 and a tip part 106 formed at the tip of the holder part 104 and serving to melt-cut a fabric with heat, the operation of which will be described subsequently. A cord 108 extending from the main body 102 is connected to a power source not illustrated. The rectangular box 14 as a constituent of the cutting apparatus 10 is provided with a flexible cord support 110 wound spirally so as to cause the cord 108 to hold in this cord support 110.

Figure 6:
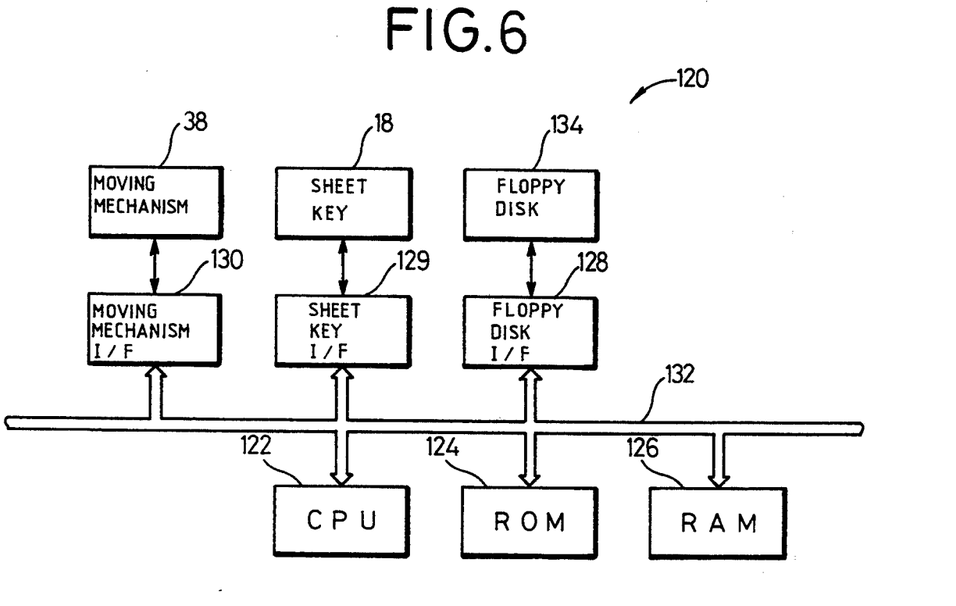
FIG. 6 is a block diagram of a control section as a constituent of the cutting apparatus.

A control section 120 of the cutting apparatus according this invention is diagrammatically illustrated in FIG. 6. Namely, the control section 120 substantially comprises a CPU 122, an ROM 124 in which information such as the original position of the heat cutter 100 and system program has been inputted in advance, an RAM 126 serving to read information corresponding to the shapes of marks, the operation of which will be described subsequently, a floppy disk interface 128, a sheet key interface 129 and a moving mechanism interface 130, these elements being connected to one another through a bus line 132 composed of a data bus, a control bus and the like.

The cutting apparatus according to this embodiment is basically constituted as described above. Its operation and effects will hereinafter be described.

Information as to desired marks A, B and C is first of all written in a floppy disk 134 by a floppy disk drive not illustrated. On the other hand, the electricity is supplied to the cutting apparatus 10 and a fabric 136 to be cut is placed on the mount 24. In this case, as the fabric 136, there may be used either a fabric having an adhesive on the back surface thereof by a laminating treatment, or a laminated fabric for marks having a base fabric and providing an adhesive on the unlaminated surface of the base fabric by a laminating treatment.

When the floppy disk 134 is then inserted into the inserting port 16 defined in the work bench 12, the information as to the marks, which has been written in the floppy disk 134, is read in the RAM 126. Accordingly, by operating the sheet key 18, the cutting apparatus is driven under a system control in accordance with the system program and the like which are stored in the RAM 126 and ROM 124.

Namely, the rotational driving sources 46 and 76 are driven to move the heat cutter 100 situated at the original position to a position at which the cutting of the fabric 136 is started. When the rotating driving shaft 46a is rotated in a predetermined direction under driving action of the rotational driving source 46, the pulley 48, which has been rotatably attached to the shaft 46a, is rotated, whereby the first moving member 56 is moved in the direction of the arrow X through the grooved belt 50 extended between the pulley 48 and the roller 52. On the other hand, when the pulley 78 is rotated in a predetermined direction through the rotating driving shaft 76a under driving action of the rotational driving source 76, the second moving member 84 is similarly moved in the direction of the arrow Y through the grooved belt 82 stretched between the pulley 78 and the guide roller 62. Accordingly, the heat cutter 100 is substantially moved in two axial directions on an orthogonal coordinate system to lead the cutter 100 to the cutting start position of the fabric 136. At that time, the drive of the respective rotational driving sources 46, 76 is stopped.

The linear solenoid 64 constituting the displacement means 63 is then actuated to displace the rod 64a in a vertical lower direction against the tensile force of the spring 70. Therefore, the swinging member 66 attached to the rod 64a is swung and displaced in the vertical lower direction and the supporting bar 72 held by the swinging member 66 and the guide bar 58 is hence swung and displaced in the vertical lower direction. In this case, when linear solenoid 64 is deenergized, the supporting bar 72 is engaged with the arm member 94 to hold the tip part 106 of the heat cutter 100 at a position over the fabric 136 [see FIG. 7(b)]. Accordingly, by swinging the supporting bar 72 in the vertical lower direction as described above, the arm member 94 is swung vertically downwardly owing to its own weight and the tensile action of the springs 96a, 96b, whereby the tip part 106 of the heat cutter 100 is brought into contact with the fabric 136 [see FIG. 7(c)]. In such a manner, the tip part 106 having been heated to a predetermined temperature melt-cuts the cutting start site of the fabric 136.

Then, the rotational driving sources 46, 76 are driven under control in accordance with the driving operation of the control section 120 to two-dimensionally move the tip part 106 of the heat cutter 100 along the desired locus, thereby conducting the melt-cutting for the desired marks A, B and C. Here, when the tip part 106 leads to an uncut site, the swinging member 66 is swung and displaced vertically upwardly under the tensile action of the spring 70 by deenergizing the linear solenoid 64, whereby the supporting bar 72 which is integrally stretched between the swinging member 66 and the mounting member 74 is moved vertically upwardly. As a result, the supporting bar 72 causes the arm member 94 to swing vertically upwardly, so that the tip part 106 of the heat cutter 100 is spaced from the fabric 136.

After melt-cutting the desired marks A, B and C out of the fabric 136 in the above-described manner, the heat cutter 100 is moved to the cleaning means 26 by driving the respective rotational driving sources 46, 76 in the state that the tip part 106 of the heat cutter 100 has been separated from the fabric 136. The rotational driving source 76 is further driven to move the second moving means 83 over the cleaning means 26 along the direction of the arrow Y. As a result, the tip part 106 is inserted into the slit 34 of the sponge 32, whereby the cleaning operation of the tip part 106 is effected by the sponge 32 containing cleaning water. The second moving member 84 is then moved in a direction separate from the rectangular box 14 along the direction of the arrow Y by driving the rotational driving source 76 to disengage the tip part 106 from the sponge 32, and moreover the heat cutter 100 is moved to the predetermined original position.

On the other hand, the fabric 136 of which the desired marks A, B and C have been cut out is removed from the mount 24 and a fresh fabric 136 is placed on the mount 24.

According to this embodiment, there are provided the first moving member 56 freely movable in the direction of the arrow X along the guide rail 54 under the driving action of the rotational driving source 46 and the second moving member 84 freely movable in the direction of the arrow Y along the guide bars 58a, 58b, which have been stretched between the first moving member 56 and the moving aid 60, under the driving action of the rotational driving source 76, and moreover the heat cutter 100 as a cutting means is attached to the second moving member 84. Therefore, the heat cutter 100 can be moved freely in the two axial directions on the orthogonal coordinate system to the fabric 136 placed on the mount 24. It is hence possible to exactly move the tip part 106 of the heat cutter 100 along the loci of the desired marks A, B and C. Therefore, the respective marks A, B and C can be exactly cut out into fixed forms compared with the conventional process in which the cutting operation for the marks is conducted by operator himself, and the automatization of the cutting operation can be achieved with ease. As a result, an effect that a variety of marks can be cut out in great quantities and at high efficiency can be attained.

In addition, the first moving means 40 and second moving means 83 in this embodiment only move linearly in the directions of the arrows X and Y respectively. Accordingly, there are obtained merits that the structure of the moving mechanism 38 is simplified and the cutting apparatus 10 can hence be made small and cheap.

Figure 7A:
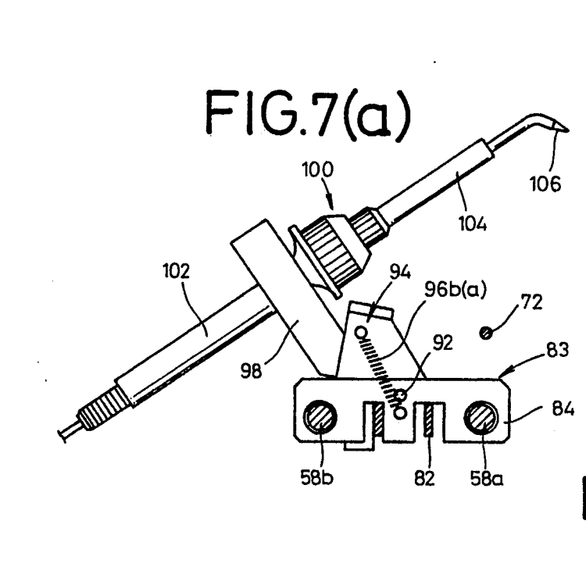
FIG. 7 is a view to illustrate the operation of a cutting means as a constituent of the cutting apparatus.
Figures 7B, 7C:
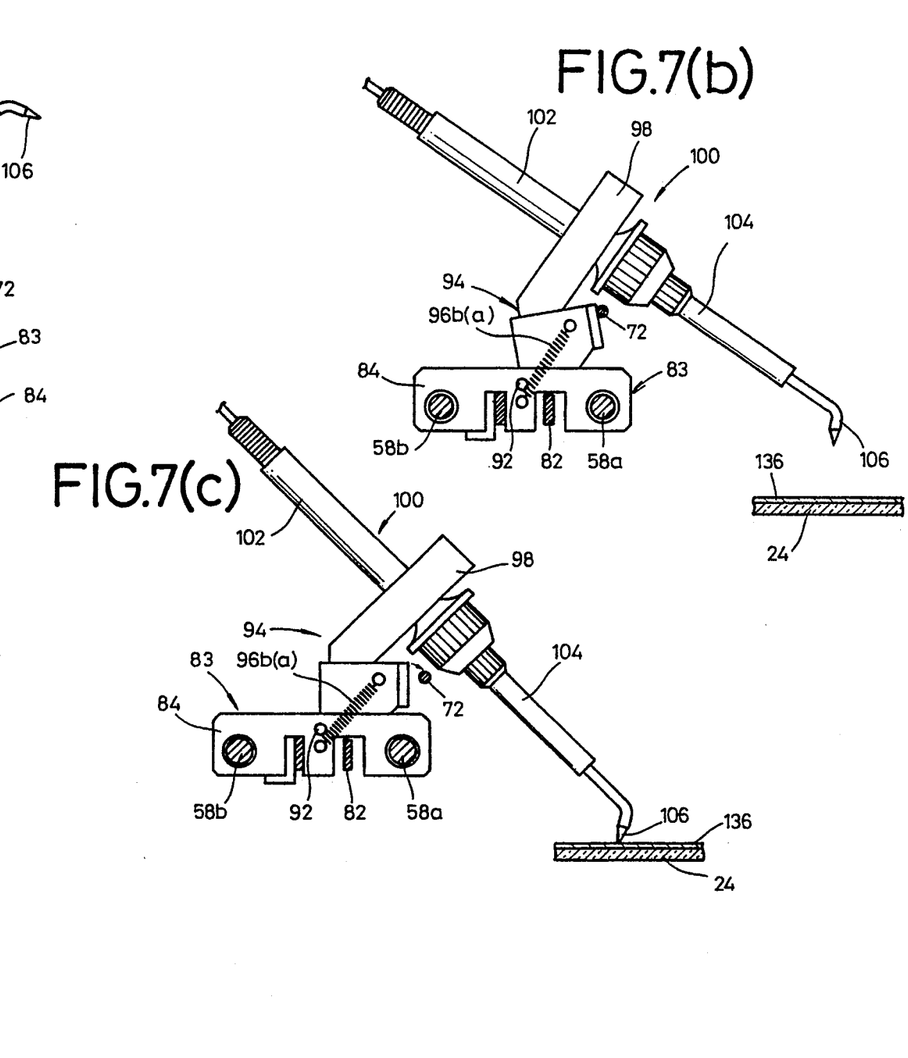

Furthermore, the arm member 94 as a constituent of the cutting apparatus 10 can swing from the vertical upper direction to the side of the guide bar 58b by a predetermined angle around the supporting shaft 92 as a point of support. Accordingly, when the marks A, B and C are removed after completion of the cutting operation of the fabric 136 by way of example, the tip part 106 does not interfere in the removing operation of the marks A, B and C so long as the heat cutter 100 is kept in the state that the tip part 106 has been lifted upwardly as illustrated in FIG. 7(a). The cutting apparatus of this invention is hence preferable. Moreover, as long as the tip part 106 is also kept in such a state upon preheating the heat cutter 100 by connecting the cord 108 to the power source in order to start the mark-cutting operation, it is possible to avoid, for example, an disadvantage that the tip part 106 is in the vicinity of the fabric 136 to melt-cut the fabric 136 unnecessarily.

Figure 8:
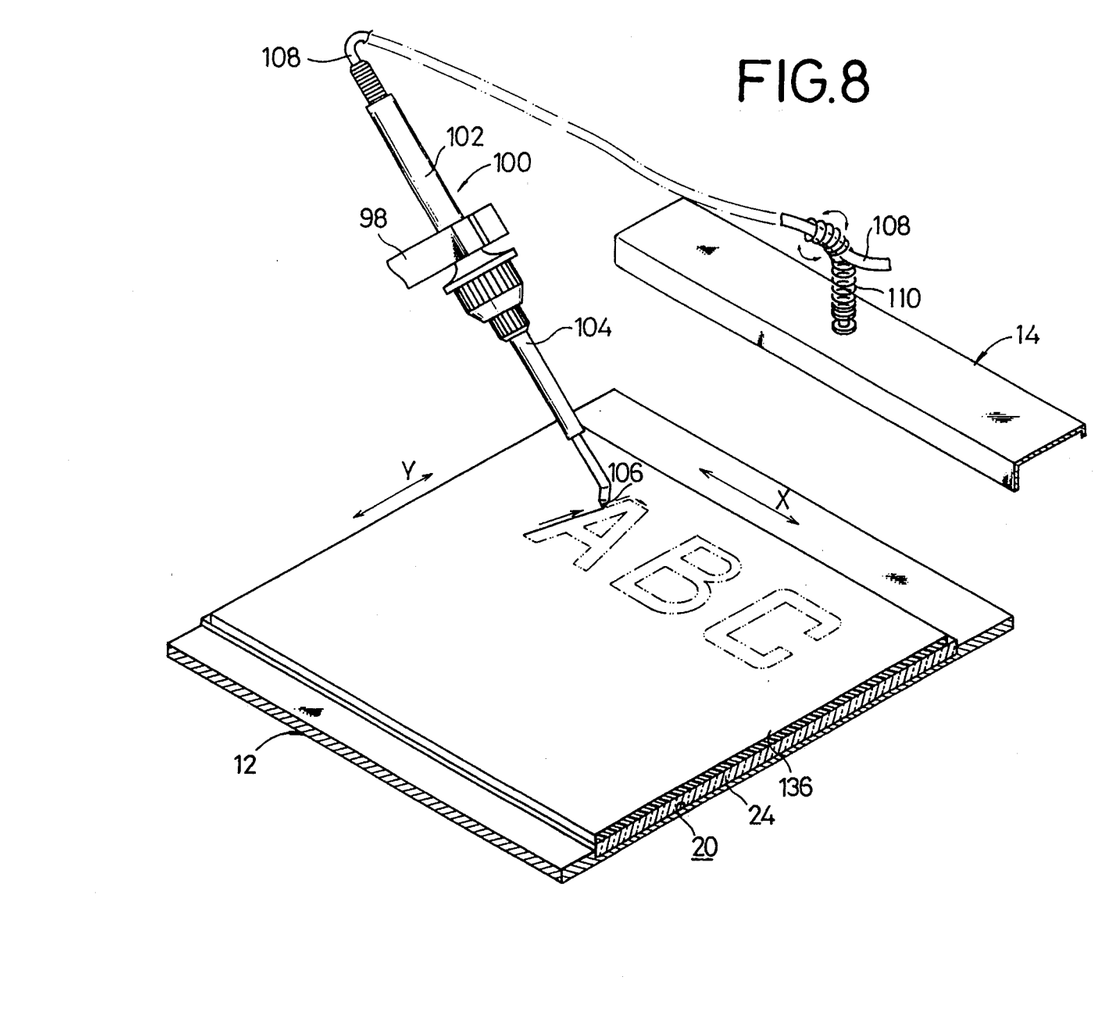
FIG. 8 is a perspective view, partially omitted, to illustrate the operation of the cutting apparatus.

Moreover, since the cord 108 for the heat cutter 100 is held in the flexible cord support 110 provided on the rectangular box 14, the cord support 110 is flexible in the state that the cord 108 is held therein upon moving the heat cutter 100 in the directions of the arrows X and Y (see FIG. 8). Accordingly, it is unnecessary to slacken the cord 108 to a great extent between the second moving member 84 and the cord support 110, so that there is obtained an effect that the mark-cutting operation can be effected extremely smooth without interference of the cord 108 in the movement of the heat cutter 100 and so on.

Further, according to this embodiment, the mount 24 is formed by a glass plate, the fabric 136 is placed on the mount 24, and the melt-cutting operation of the fabric 136 is then conducted by the heat cutter 100 as depicted in FIG. 7. Therefore, even when the heat cutter 100 is moved in the directions of the arrows X and Y to slide the tip part 106 on the mount 24, the mount 24 is not damaged unlike the conventional stainless steel. As a result, there are obtained advantages that the exchange operation of the mount 24 becomes unnecessary, high efficiency can be attained over the whole operation and the cutting apparatus 10 becomes economical.

Furthermore, even when the tip part 106 is heated to a considerably high temperature, the temperature of the mount 24 itself is not raised. Therefore, there is obtained, for example, an effect that it is possible to prevent the fabric 136 from fixing to the mount 24 due to the melting of the adhesive provided on the back surface of the fabric 136.

Figure 9:
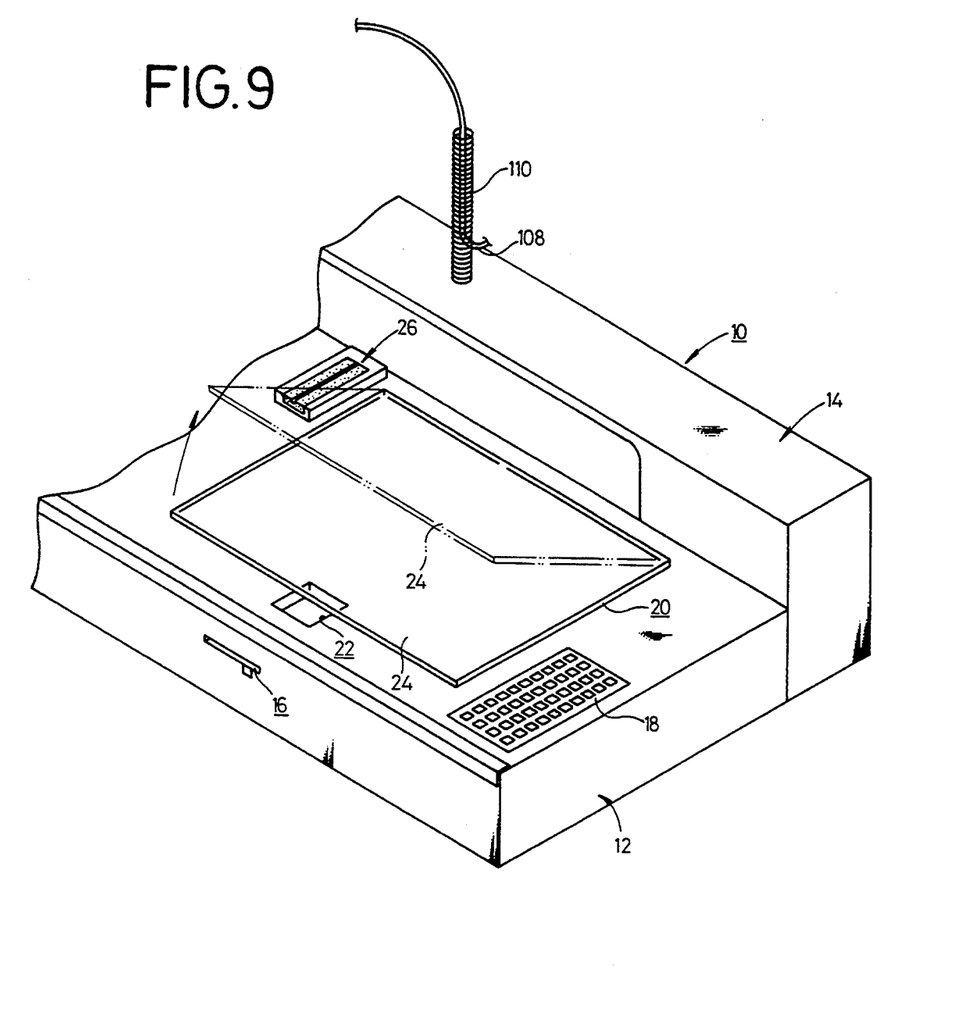
FIG. 9 is an explanatory illustration showing the removing operation of a mount disposed on a work bench.

Moreover, the mount 24 is disposed in the recess 20 of the work bench 12 and the portion of the opening 22 greater in depth than that of the recess 20 communicates with the recess 20. Therefore, after completion of the melt-cutting operation for the marks A, B and C, the mount 24 can be taken together with the fabric 136 subjected to the melt-cutting operation out of the work bench 12 by inserting the fingers of the operator into the opening 22 to dispose a fresh mount 24 in the recess 20 of the work bench 12 (see FIG. 9). By doing so, while a new fabric 136 is placed on the fresh mount 24 and then subjected to a desired melt-cutting operation, it is possible to remove the fabric 136 subjected to the melt-cutting operation from the mount 24 with the fabric placed thereon as described above. As a result, there is obtained an advantage that the melt-cutting operation can be achieved more efficiently.

Besides, according to this embodiment, the cleaning means 26 is disposed on the work bench and in the vicinity of the original position of the heat cutter 100 as a cutting means. Therefore, when the heat cutter 100 is moved to the cleaning means 26 through the control section 120 after completion of the cutting operation for any desired marks by the heat cutter 100 under the driving action of the moving mechanism 38, the tip part 106 is inserted into the slit 34 of the sponge 32, whereby the tip part 106 can be cleaned automatically. The heat cutter 100 is then moved to the predetermined original position, whereby the next mark-cutting operation can be achieved rapidly.

As described above, the heat cutter 100 is cleaned automatically by the cleaning means 26 before the heat cutter 100 is moved to the original position. Therefore, there is obtained an effect that high efficiency can be attained over the whole mark-cutting operation without stopping the mark-cutting operation. In addition, it is unnecessary for the operator himself to clean the heat cutter 100. Therefore, there is obtained advantages that the burden of the operator can be lightened and the automatization of the mark-cutting operation is easily attempted.

Here, the cleaning operation of the heat cutter 100 may be conducted either at every predetermined lapse of time or at every mark, specifically, after completion of the respective melt-cutting operations for the mark A, B and C.

By the way, although the heat cutter 100 is used as a cutting means in this embodiment, a gas torch by way of example may be used. In this case, it is only necessary to operate the gas torch by remote control.

Alternatively, it is also possible to constitute the cutting apparatus by equipping an X-Y plotter, which is suitable for use in drawing line drawing and the like on drafting paper, with a cutting means such as a heat cutter instead of a pen.

As has been described above, the present invention provides advantages that desired marks such as letters and numerals can be automatically and precisely cut out of the fabric, and high efficiency can be attained over the whole mark-cutting operation, and moreover effects that the mechanism for moving the cutting means such as a heat cutter two-dimensionally to the fabric is sharply simplified, and the whole cutting apparatus can be made small and manufactured economically.

Further, the present invention provides the following effects. Namely, since the fabric is placed on the mount made of a glass plate to cut it by the cutting means such as the heat cutter, it is possible to prevent the mount from being damaged and heated by the cutting means. Therefore, there is no necessity of frequently exchanging the mount for another mount and the fabric is free from fixing to the mount unnecessarily. It is hence possible to effect the mark-cutting operation at extremely high efficiency.

Moreover, according to this invention, desired marks such as letter and numerals can be automatically cut out of the fabric by the cutting means such as the heat cutter and molten matter and the like adhered on the cutting means can be removed automatically and easily. Therefore, there is no necessity of stopping the mark-cutting operation for the purpose of cleaning the cutting means. In addition, it is possible to perform the cleaning operation rapidly compared with the operation that the operator himself cleans it directly. Accordingly, this invention provides effects that high efficiency can be easily attained as the whole mark-cutting operation and the automatization of the mark-cutting operation can be achieved with ease.

Although the present invention has been described above with reference to the preferred embodiments thereof, it is to be understood that the invention is not limited thereto and that various modifications and changes in form and details can be made therein without departing from the spirit and scope of the invention.

What is claimed is:

1. A cutting apparatus for cutting a sheet material such as a fabric or the like for a mark, which comprises:
    a work bench on which the material is placed;
    a moving mechanism movable in two axial directions on an orthogonal coordinate system along the work bench;
    a cutting means attached to the moving mechanism for cutting a desired mark out of the material; and
    a cleaning means comprising an absorbent cleaning member for automatically cleaning the cutting means, wherein the cutting means is inserted in the absorbent cleaning member and displaced in one of said axial directions through the absorbent cleaning member by moving the cutting means under operation of the moving mechanism.

2. A cutting apparatus as claimed in claim 1, wherein the cleaning means substantially comprises a sponge containing cleaning water and a slit is cut in the sponge so as to insert the cutting means in the slit by moving it under operation of the moving mechanism to clean the cutting means.

3. A cutting apparatus as claimed in claim 1, wherein the cleaning means is disposed on the work bench and in the vicinity of the original position of the cutting means and the cutting means is cleaned after each respective cutting operation.

4. A cutting apparatus as claimed in claim 1, wherein the moving mechanism comprises:
    a first moving means freely movable in one direction along the side of the work bench; and
    a second moving means disposed on the first moving means, freely movable in the direction perpendicular to said one direction, and equipped with the cutting means.

5. A cutting apparatus for cutting a sheet material such as a fabric or the like, which comprises:
    a work bench on which the material is placed;
    a moving mechanism movable in two axial directions on an orthogonal coordinate system along the work bench;
    a cutting means comprising a heat cutter mounted on said moving mechanism for cutting a desired mark out of the material, said heat cutter comprising a heated pointed tip displaceable to a location of non-piercing contact with an upper surface of the material, wherein heat generated at said heated pointed tip causes said material to dissolve at said location of non-piercing contact, thereby heat cutting the material; and
    cleaning means for automatically cleaning the cutting means, said cleaning means comprising a cleaning member, wherein the cutting means is brought into contact with the cleaning member for cleaning the cutting means.

6. A cutting apparatus as claimed in claim 5, wherein said cleaning member comprises an absorbent member, wherein the cutting means is inserted in the absorbent member and displaced in one of said axial directions through the absorbent member by moving the cutting means under operation of the moving mechanism.

7. A cutting apparatus as claimed in claim 5, wherein the cleaning means comprises a sponge containing cleaning water, and a slit is cut in the sponge, wherein the cutting means is inserted in the slit and displaced in one of said axial directions through the slit.

8. A cutting apparatus as claimed in claim 5, wherein the cleaning means is disposed on the work bench and in the vicinity of the original position of the cutting means and the cutting means is cleaned after each respective cutting operation.

9. A cutting apparatus for cutting a sheet material such as a fabric or the like, which comprises:
    a work bench on which the material is placed;
    a moving mechanism movable in two axial directions on an orthogonal coordinate system along the work bench;
    a cutting means comprising a heat cutter mounted on said moving mechanism for cutting a desired mark out of the material, said heat cutter comprising a heated pointed tip displaceable into contact with a surface of the material for heat cutting the material; and
    cleaning means for automatically cleaning the cutting means, said cleaning means comprising an absorbent cleaning member, wherein the cutting means is brought into contact with the absorbent cleaning member for cleaning the cutting means, wherein the cutting means is inserted in the absorbent cleaning member and displaced in one of said axial directions through the absorbent member by moving the cutting means under operation of the moving mechanism.

10. A cutting apparatus as claimed in claim 9, wherein the cleaning means comprises a sponge containing cleaning water, and a slit is cut in the sponge, wherein the cutting means is inserted in the slit and displaced in one of said axial directions through the slit.

11. A cutting apparatus as claimed in claim 9, wherein the cleaning means is disposed on the work bench and in the vicinity of the original position of the cutting means and the cutting means is cleaned after each respective cutting operation.

* * * * *